(12) United States Patent
Guim Bernat et al.

(10) Patent No.: US 12,026,074 B2
(45) Date of Patent: Jul. 2, 2024

(54) CONTINUOUS TESTING, INTEGRATION, AND DEPLOYMENT MANAGEMENT FOR EDGE COMPUTING

(71) Applicant: Intel Corporation, Santa Clara, CA (US)

(72) Inventors: Francesc Guim Bernat, Barcelona (ES); Kshitij Arun Doshi, Tempe, AZ (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 17/028,844

(22) Filed: Sep. 22, 2020

(65) Prior Publication Data

US 2021/0011823 A1 Jan. 14, 2021

(51) Int. Cl.
*G06F 9/445* (2018.01)
*G06F 11/263* (2006.01)

(52) U.S. Cl.
CPC ........ *G06F 11/263* (2013.01); *G06F 9/44505* (2013.01)

(58) Field of Classification Search
CPC .......... G06F 11/263; G06F 9/445; G06F 8/60; G06F 9/455; G06F 9/50
See application file for complete search history.

(56) References Cited

U.S. PATENT DOCUMENTS 5,668,717 A * 9/1997 Spall ...................... G08G 1/081
706/903

2018/0054379 A1 * 2/2018 Bursell .................. H04L 43/20
2019/0147188 A1 * 5/2019 Benaloh ................ G06F 21/53
726/26

FOREIGN PATENT DOCUMENTS

DE 102021209019 3/2022
WO 2020226979 11/2020

OTHER PUBLICATIONS

"German Application Serial No. 102021209019.2, Office Action dated Jan. 14, 2022", w Concise Statement of Relevance, 3 pgs.
(Continued)

*Primary Examiner* — Juan M Guillermety
(74) *Attorney, Agent, or Firm* — Schwegman Lundberg & Woessner, P.A.

(57) ABSTRACT

Various aspects of methods, systems, and use cases for testing, integration, and deployment of failure conditions in an edge computing environment is provided through use of perturbations. In an example, operations to implement controlled perturbations in an edge computing platform include: identifying at least one perturbation parameter available to be implemented with a hardware components of an edge computing system that provides a service using the hardware components; determining values, which disrupt operation of the service, to implement the perturbation parameter among the hardware components; deploying the perturbation parameters to the hardware components, during operation of the service to process a computing workload, to cause perturbation effects on the service; collecting telemetry values associated with the hardware components, produced during operation of the service that indicate the perturbation effects upon the operation of the service; and cause a computing operation to occur based on the collected telemetry values.

23 Claims, 13 Drawing Sheets

(56) References Cited

OTHER PUBLICATIONS

"German Application Serial No. 102021209019.2, Response filed Jan. 19, 2022 to Office Action dated Jan. 14, 2022", w English claims, 13 pgs.

Nallur, Vivek, "A Decentralized Self-Adaptation Mechanism for Service-Based Applications in the Cloud", IEEE Transactions on Software Engineering, (May 2013), 24 pgs.

* cited by examiner

CONTINUOUS TESTING, INTEGRATION, AND DEPLOYMENT MANAGEMENT FOR EDGE COMPUTING

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Although edge computing environments are expected to open up entirely new classes of applications and services, such settings are still subject to many of the same failure and reliability issues encountered within conventional computing settings. Although a large amount of information in the edge cloud is logged and made available regarding failure and service performance, existing approaches have not made sense of this information or used such information to improve service delivery or to identify failure causes and conditions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 1.0 illustrates a flowchart of an example process for deploying and controlling perturbations within a multi-tier edge computing environment.

DETAILED DESCRIPTION

The following embodiments generally relate to aspects of testing, integration, and deployment management in a distributed edge computing environment. In an edge computing environment, failures are statistical; a failure may or may not be associated with version of software/service, but may also be an artifact of connection intermittency, infrastructure overloads, timing violations, etc. Thus, to maintain a proper operational environment, it is important to obtain a correct picture that correctly identifies the cause of failures for attribution specifically to continuous integration (CI) and continuous delivery (CD) operations, security breaks, hardware failures, and the like.

The following embodiments specifically discuss various approaches for obtaining a statistically analyzed view of failures and issues during operation of an edge computing system. These include various approaches for hardware, software, and statistical failure modeling which, among other examples integrates load-balancing and telemetry flows with testing approaches (e.g., A-B testing regimes). Additionally, these approaches include incorporating a collection of failure data across the multiplicity of edge nodes, to produce useful telemetry, so that software has an automatic, statistically filtered view of failures.

In an example, various types of perturbations (e.g., controlled disruptions and introduced problems and variations) are introduced among edge computing locations during service runtime, as a way to produce useful telemetry and operational data. Based on real-time behavior analyses in highly interdependent clusters of machines. The use of controlled perturbations during actual service operation makes offline studies mostly unnecessary—improving speed and efficiency for system operations. Further, the use of controlled perturbations may help directly identify workload sensitivities during system operation, to reduce experimental error, automate regression, and improve optimization/remediation process flows.

Other benefits from the following perturbation deployment and telemetry collection processes will also be apparent. As an example, performing learning on the result of perturbations enables a correlation of failures to specific hardware or software components, and allows more precise identification of issues. Also, in an example, improved management of perturbation operations (and improved security of such operations) may be implemented from a variety of control interfaces introduced with a perturbations management unit. Additional details on these and other features of perturbation deployment and telemetry collection is provided after the following edge computing system overview.

Figure 1:
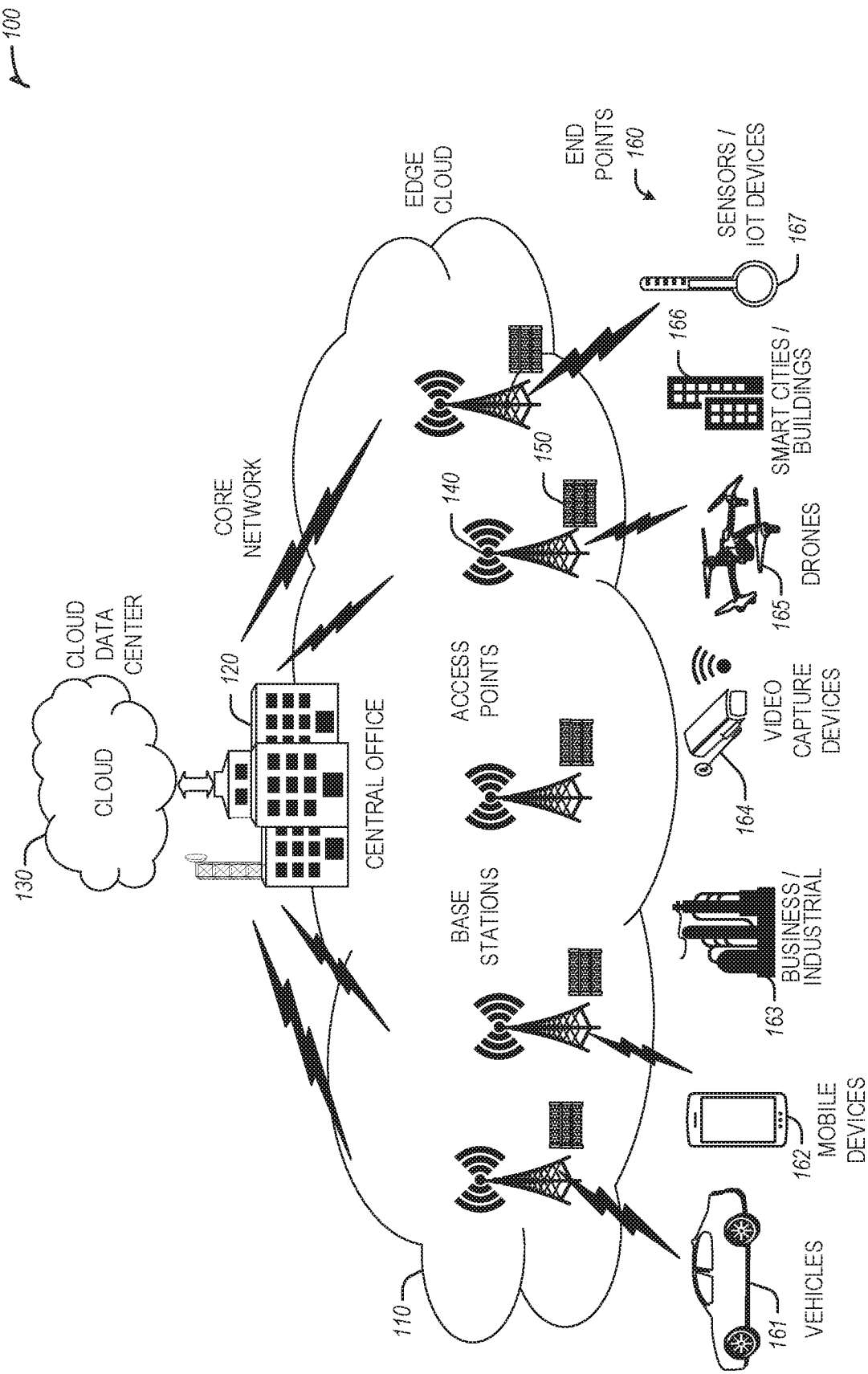
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
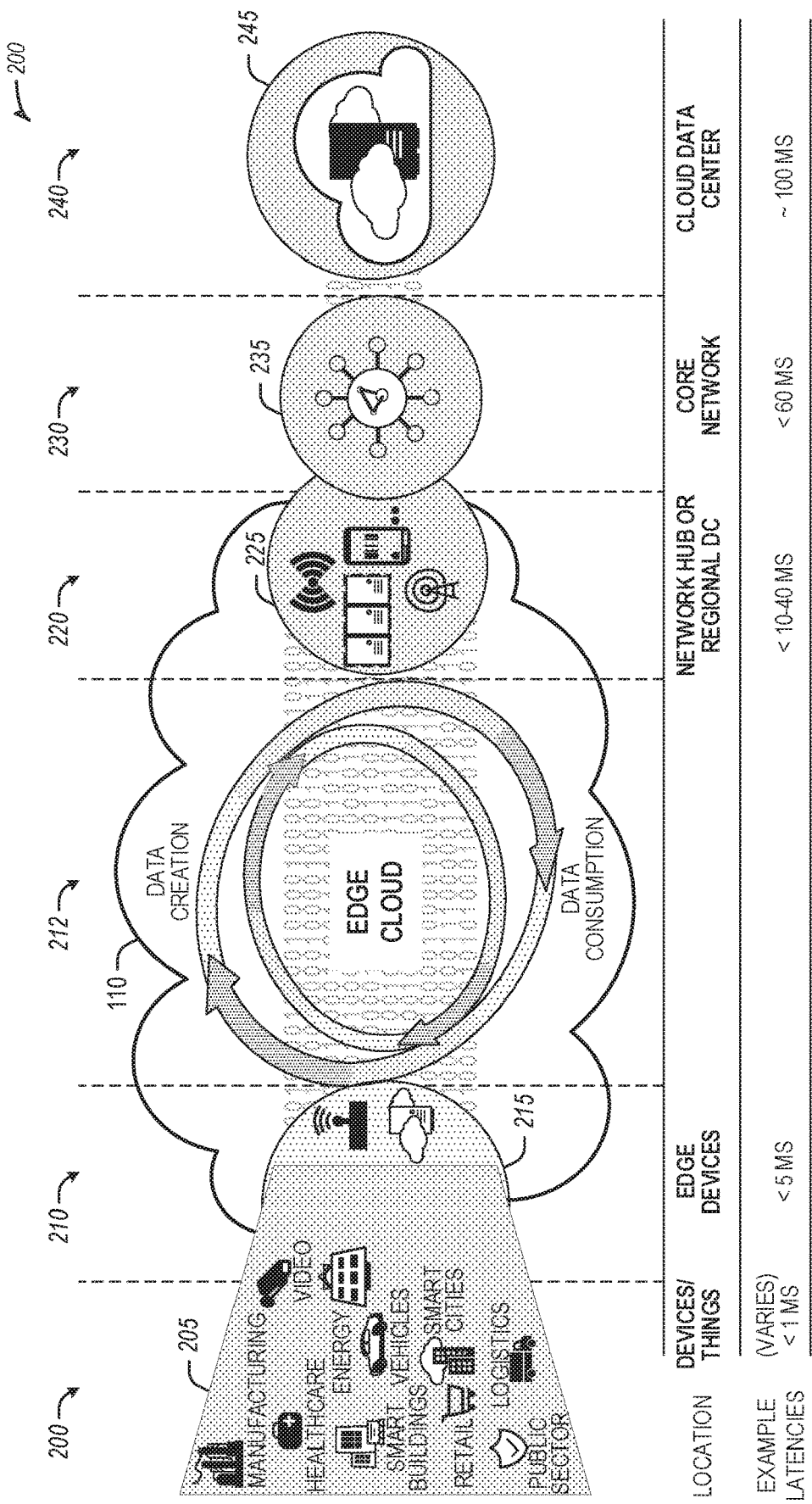
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ins at the core network layer 230, to 100 or more ins at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be hosted among one or more appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
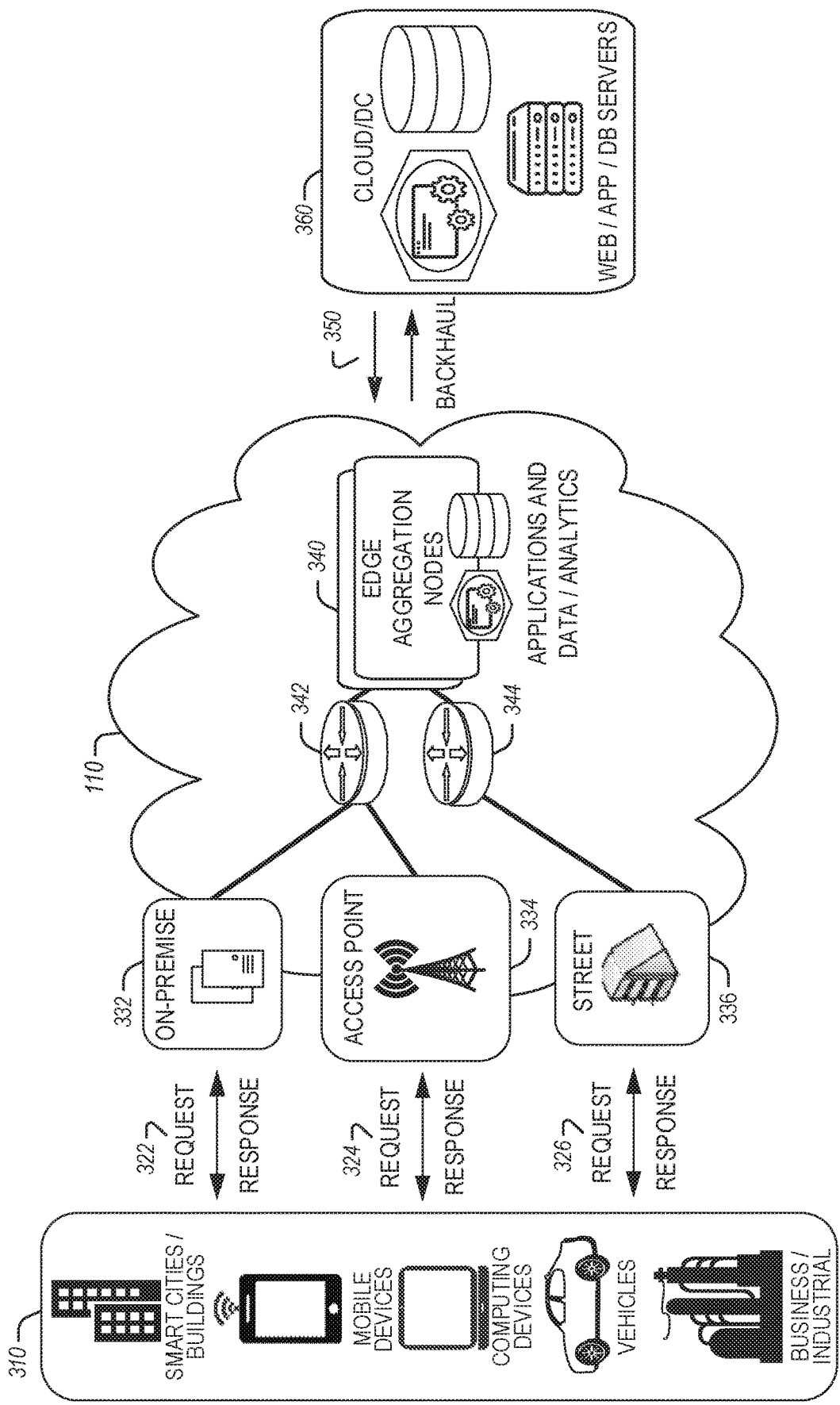
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
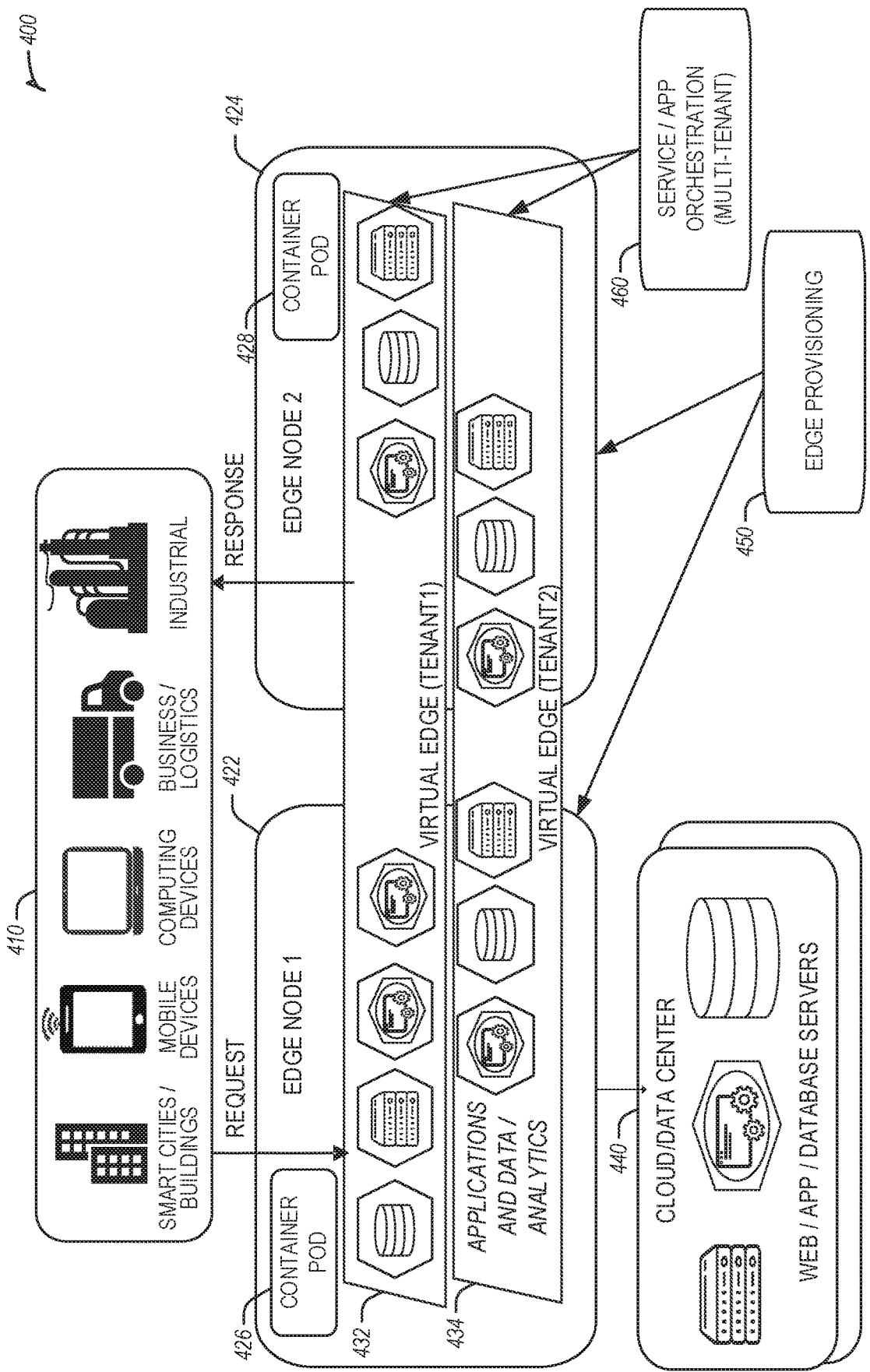
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
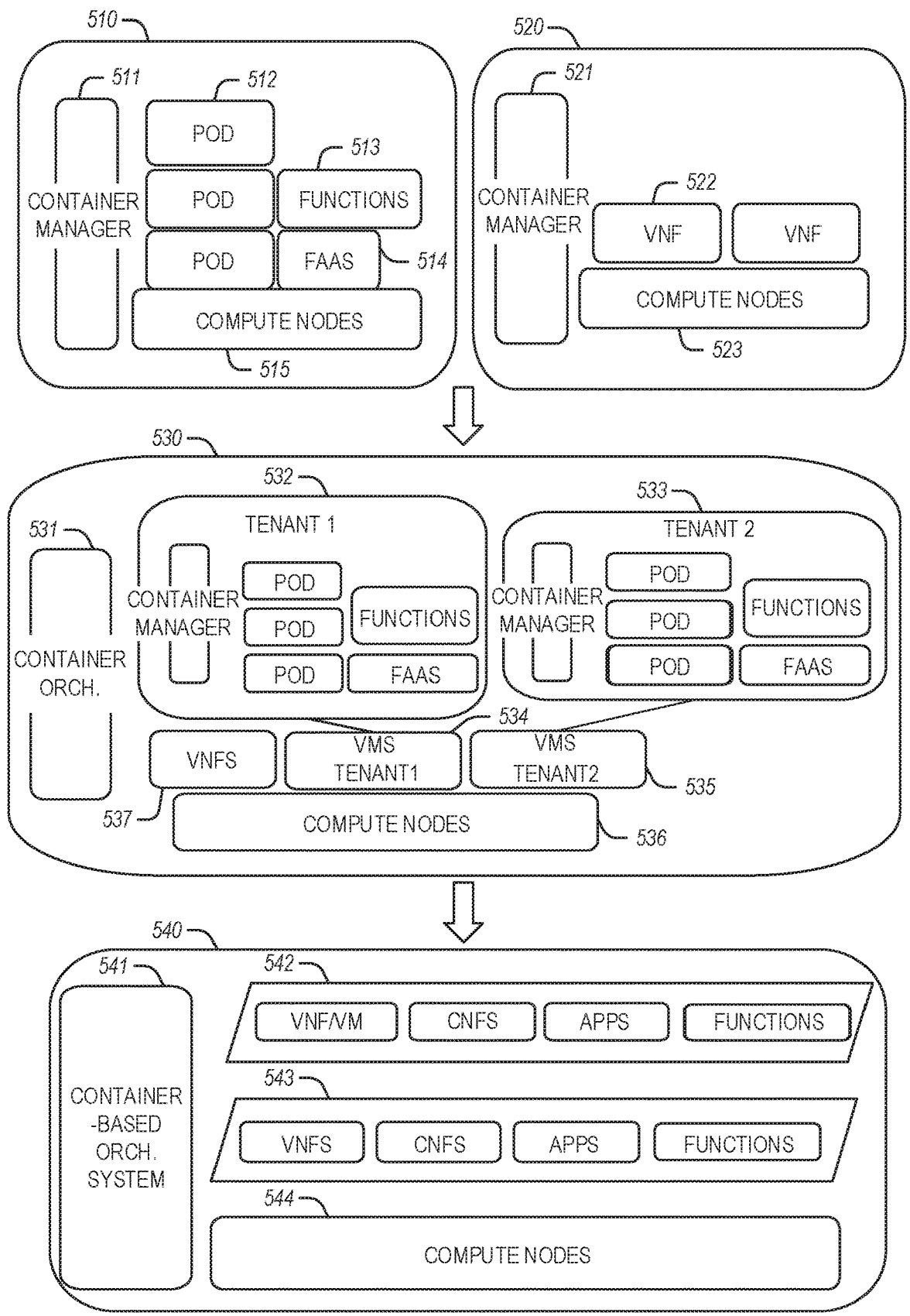
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 536), where containerized pods (e.g., pods 512), functions (e.g., functions 513, VNFs 522, 537), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in 11G. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
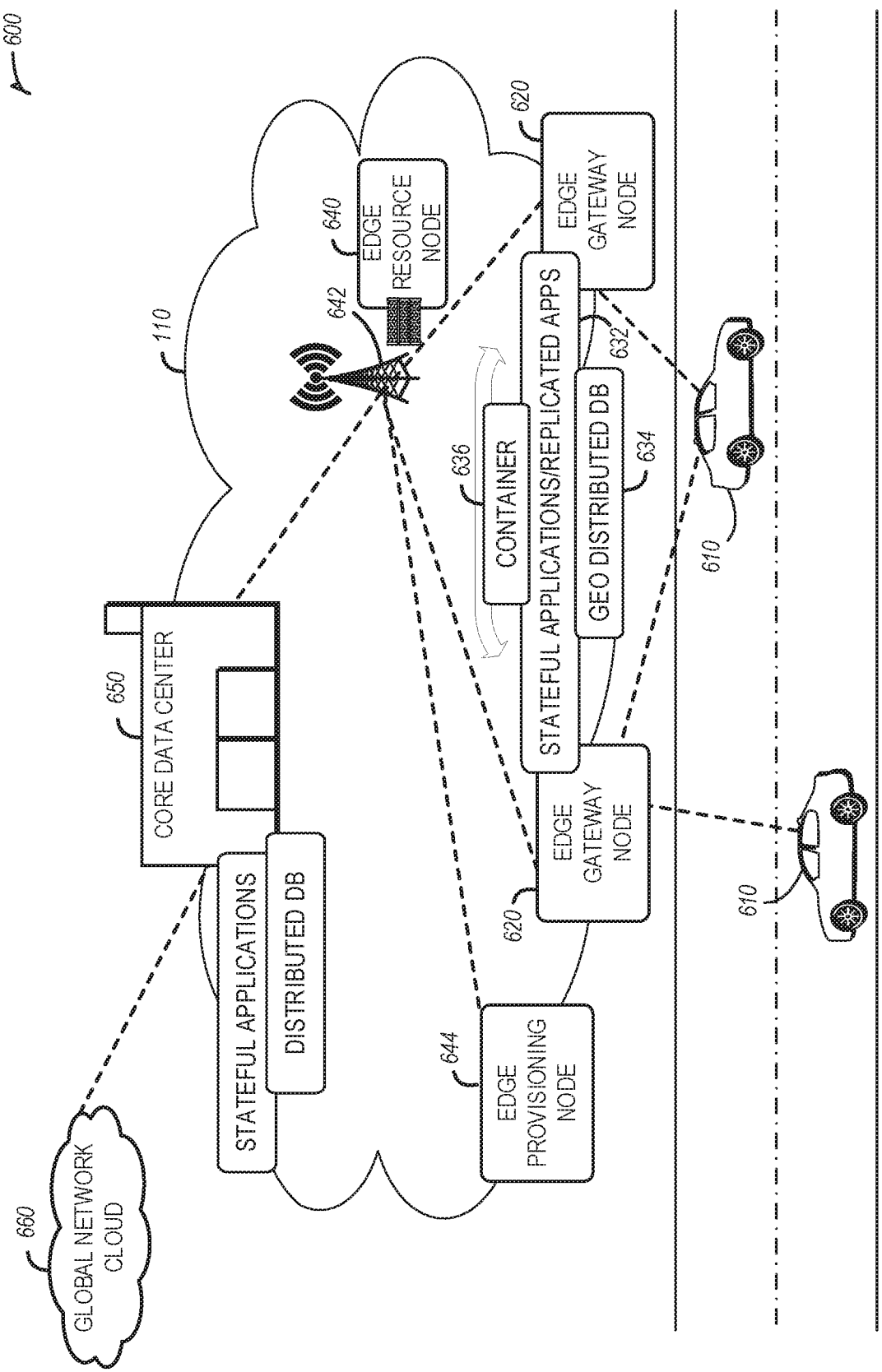
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 6:20 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 6:20 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
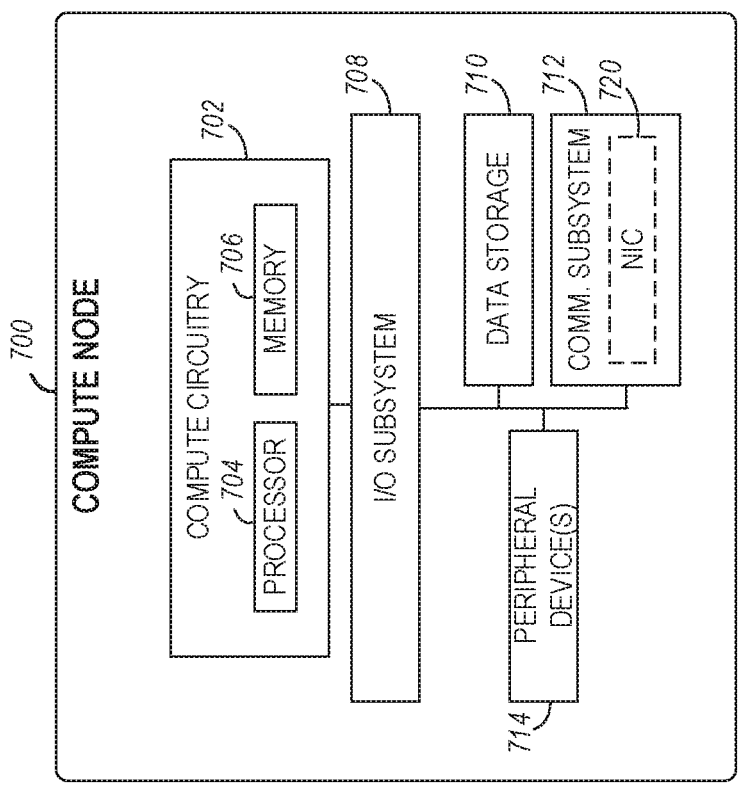
FIG. 7A illustrates an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory, controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
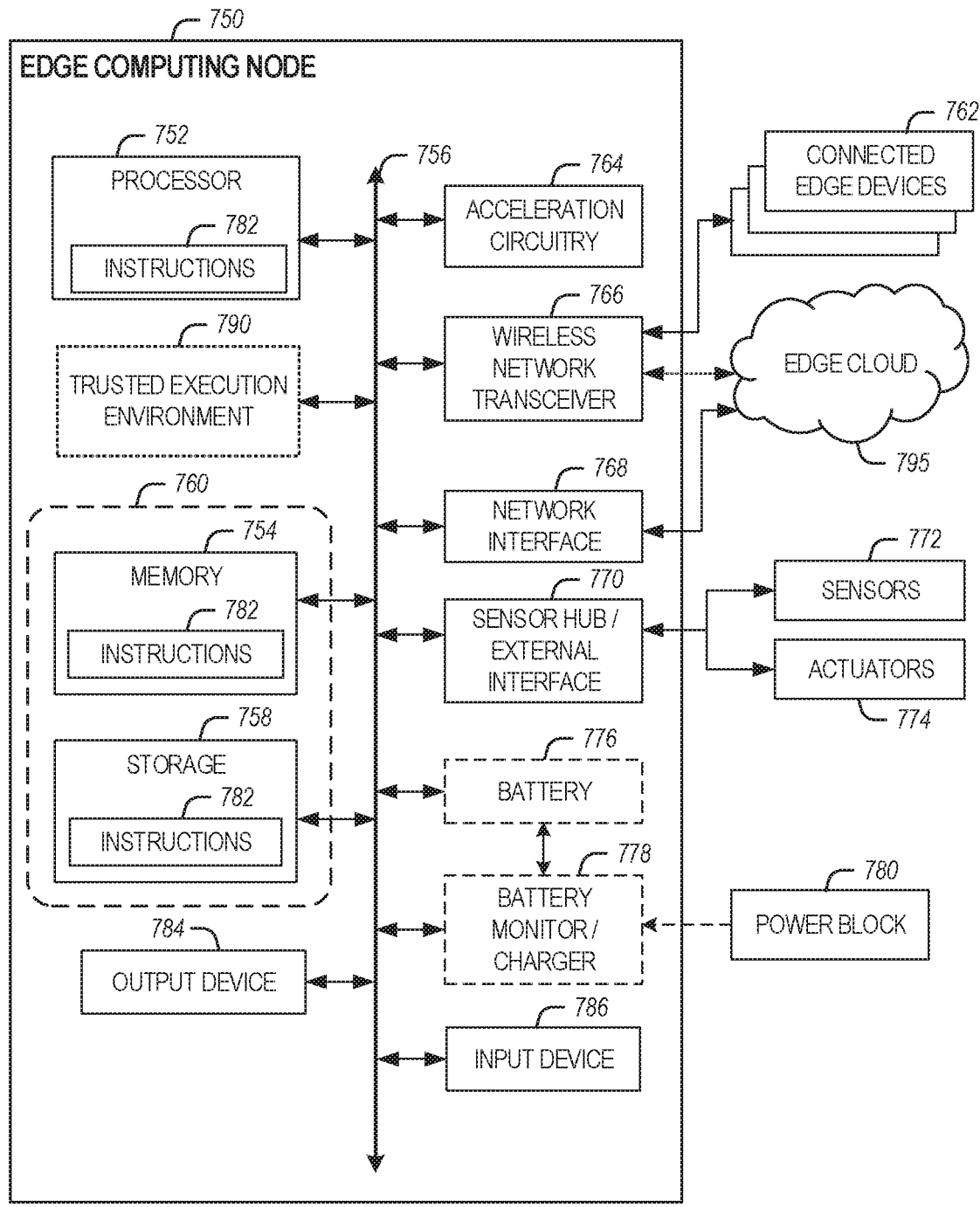
FIG. 7B illustrates a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STD-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated. Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 80:2.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of CPUs, an arrangement of xPUs/DPUs/IPU/ NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may, include the specific edge computing tasks for service management and service operations discussed elsewhere in this document.

The interconnect 756 may couple the processor 752 to a sensor huh or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (AMC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may, be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

As will be understood from the preceding overview, computing in edge clouds is highly decentralized. Edge computing is emerging as a special category of operations in which events and requests and data streams are processed in a manner that should lead to low and deterministic latency responses. However, due to unknown or unresolved issues and failures, erratic and unpredictable performance may occur at different areas of the edge cloud.

Figure 8:
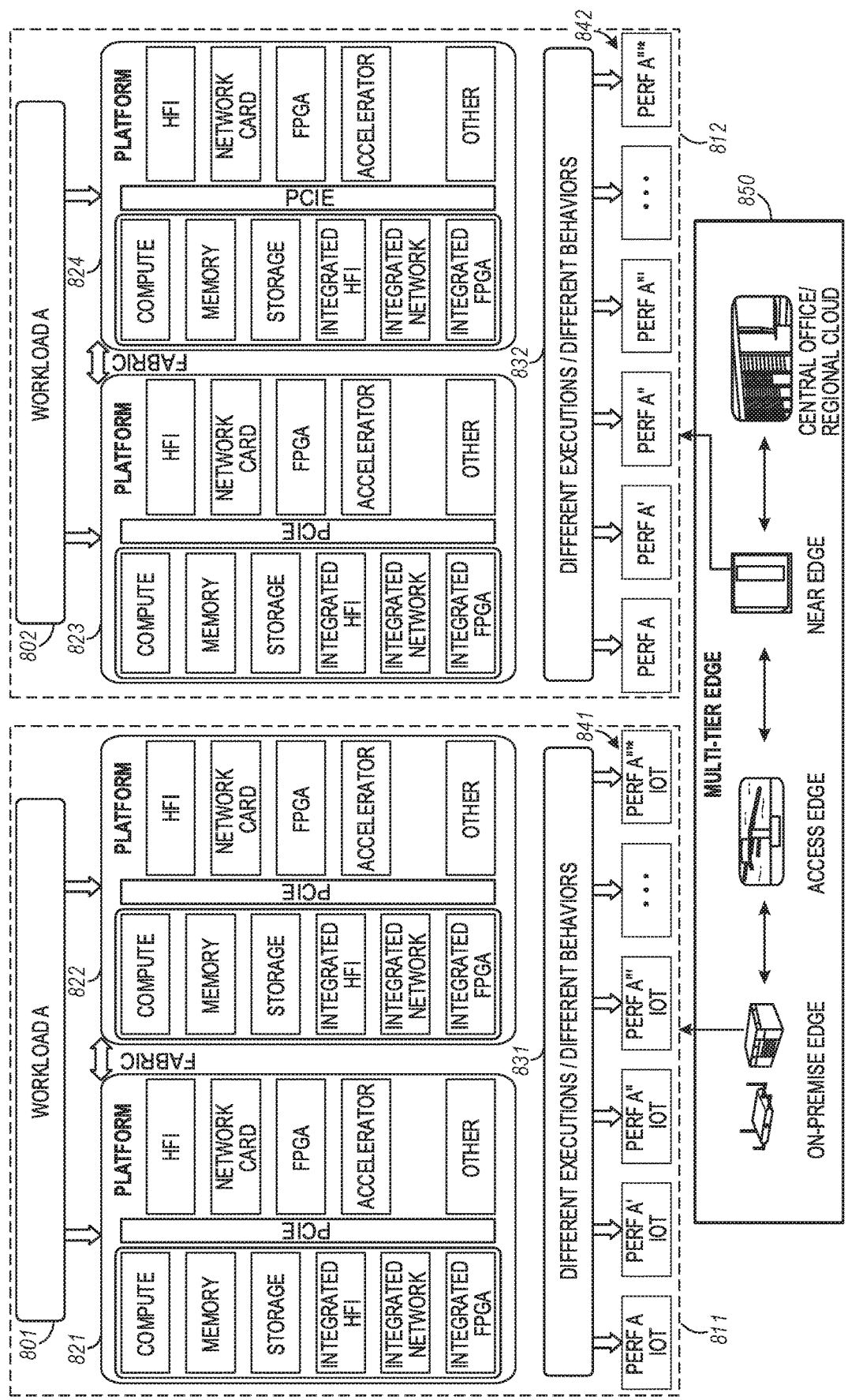
FIG. 8 illustrates a multi-tier edge computing environment, performing workload execution with a variety of different executions and different behaviors.

FIG. 8 illustrates a multi-tier edge computing environment, performing workload execution with a variety of different executions and different behaviors. This figure shows, at high level, a concept of three tier (endpoint, edge, and cloud) computation and data processing with various edge computing locations provided in a middle tier 850. In this middle tier 850, many different edge computing, communication, and storage resources are aggregated flexibly and dynamically in hierarchical or peer-to-peer relationships for meeting response-time and communication bandwidth critical needs, and while mobilizing the deeper and richer resource networks in traditional cloud settings for more complex, computation intensive operations.

As shown in FIG. 8, a multi-tier edge computing environment may include compute execution being performed at node locations of the middle tier 850 such as at an on-premise edge computing node, an access edge computing node, a near edge computing node, or a central office/regional cloud edge computing node. In this context, it becomes very complicated to understand how applications will behave under different types of edge computing configurations, inter-arrival times and types of requests from endpoint devices 310, and types of locations, because different network locations and different hardware workloads behave quite differently. Further, any change in the hardware of an edge computing location is likely to cause changes in the workload performance.

Within the scenario of FIG. 8, an on-premise edge node 811 is shown to execute a workload 801 via coupled hardware platforms 821, 822; the resulting different executions and different behaviors 831 of the workload 801 produce respective sets of telemetry 841, as shown with performance telemetry for workload A provided from an on-premise IoT processing environment. Also shown within the scenario of FIG. 8, a near edge node 812 is shown to execute a similar workload 802 via coupled computing hardware platforms 823, 824; the resulting different executions and different behaviors 832 produce respective sets of telemetry 842, in the form of performance telemetry for workload A provided from a near edge node 812 execution environment.

Although telemetry can be collected from the various workload executions, many different execution instances and behaviors will be observed. Within the edge cloud, the challenge is not only considering how different workloads are deployed in different locations, but also to consider how applications or systems themselves will perform differently for even the same workload under different conditions. In this setting, intentional and controlled variations may be introduced from the use of perturbations, to identify resulting issues and problems during system operations. For example, variations provided from controlled perturbations may include: multi workload collocation; fabric congestion; different power conditions; among many other variations. Each of these variations can be used to introduce different states of the system that provide different results and useful telemetry for error or problem analysis and/or for analyses of large performance excursions.

The use of controlled hardware component disruptions (referred to herein as perturbations) may be applied to a number of components and configurations of an edge computing platform. Such controlled perturbations may be implemented within larger methods and systems that attempt to perform real-time behavior analyses in highly interdependent clusters of machines. The controlled perturbations enable the collection of telemetry to identify workload and hardware throughputs and failure rate sensitivities directly during system operation, reducing experimental error, automating regression, and improving optimization/remediation process flows.

The effectiveness of the following approaches may be provided by inducing controlled, stochastic (and/or exact) perturbation across a wide range of individual hardware parameters of the edge computing node. For instance, disruptive perturbations may be applied to respective cores, memory controllers, interconnects such as a host fabric interface (HFI), switches, etc. Additionally, these disruptive perturbations may be deployed and orchestrated across multiple edge platforms and locations without involving complex software or intrusive steps for micro-managing the hardware components.

Figure 9:
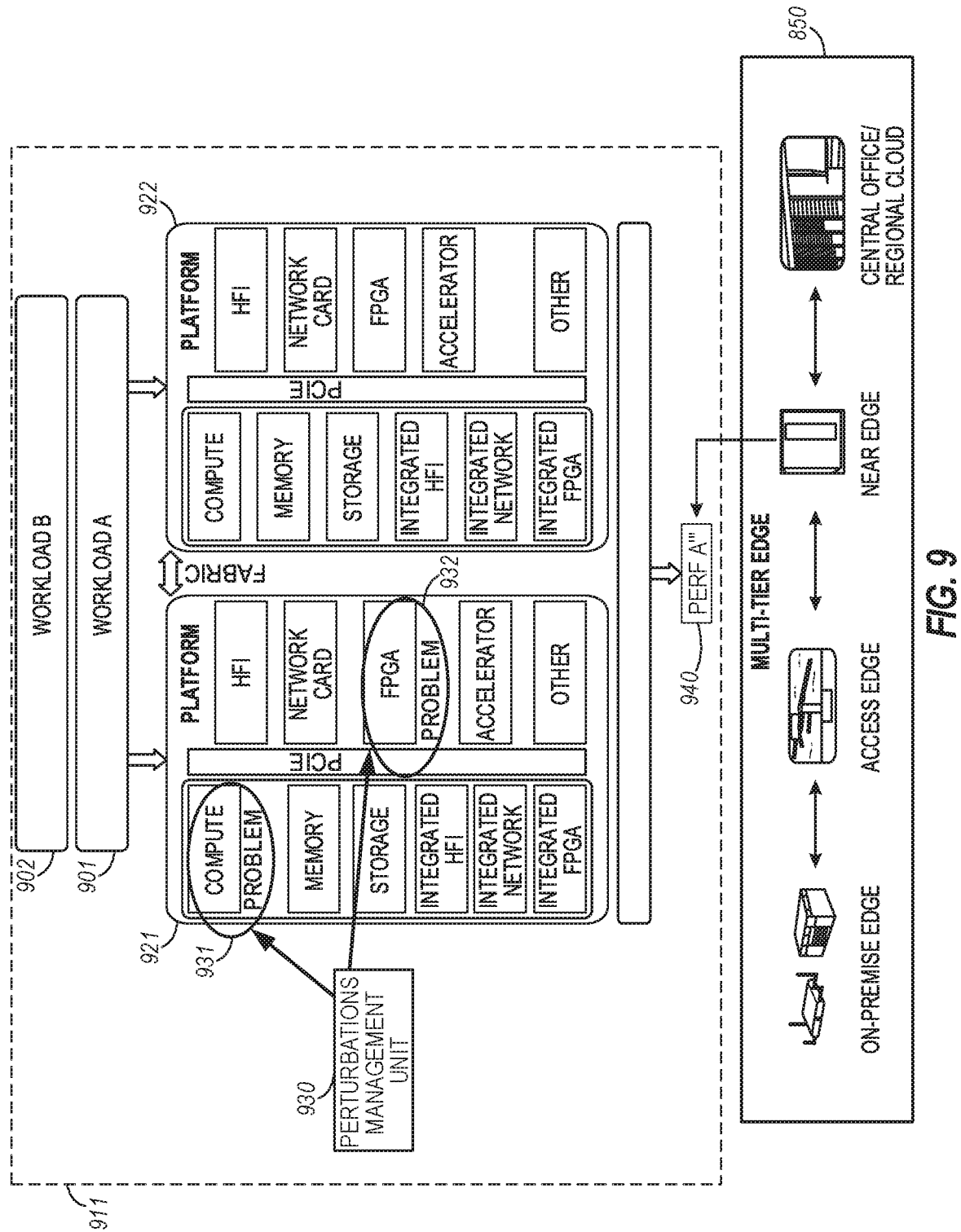
FIG. 9 illustrates an introduction of perturbations at a location of a multi-tier edge computing environment.

FIG. 9 illustrates an introduction of perturbations at a location of a multi-tier edge computing environment. In this example, hardware assisted perturbations may be deployed within an edge computing system 911 through the use of a Perturbations Management Unit 930 (referred to as a "PMU" in the following paragraphs). Additional details on the operation of the PMU in a larger edge computing environment is provided in FIG. 11, discussed below.

In the setting depicted in FIG. 9, the edge computing system 911 is configured to process multiple workloads, including workload A 901 and workload B 902, with the use of multiple platforms 921, 922. In this setting, perturbations are introduced from a perturbation management unit 930 that provides a first disruption 931 (a controlled problem) into compute hardware resources (e.g., a CPU) and a second disruption 932 (another controlled problem) into programmed compute hardware resources (e.g., an FPGA) within platform 921. The perturbation management unit 930 and similar management units discussed herein may be implemented by general purpose hardware (e.g., a CPU) with specialized programmed software, or by specialized hardware. These perturbations may be introduced during the execution of one or both of the workloads 901, 902. The platform 922, in this scenario, does not experience perturbations. The resulting performance telemetry 940 is produced from each of the platforms 921, 922 and workloads 901, 902; analysis of the differences of telemetry 940 provided from platforms 921, 922 and workloads 901, 902 may be useful to indicate failures, failure areas, and a number of otherwise latent issues.

Figure 10:
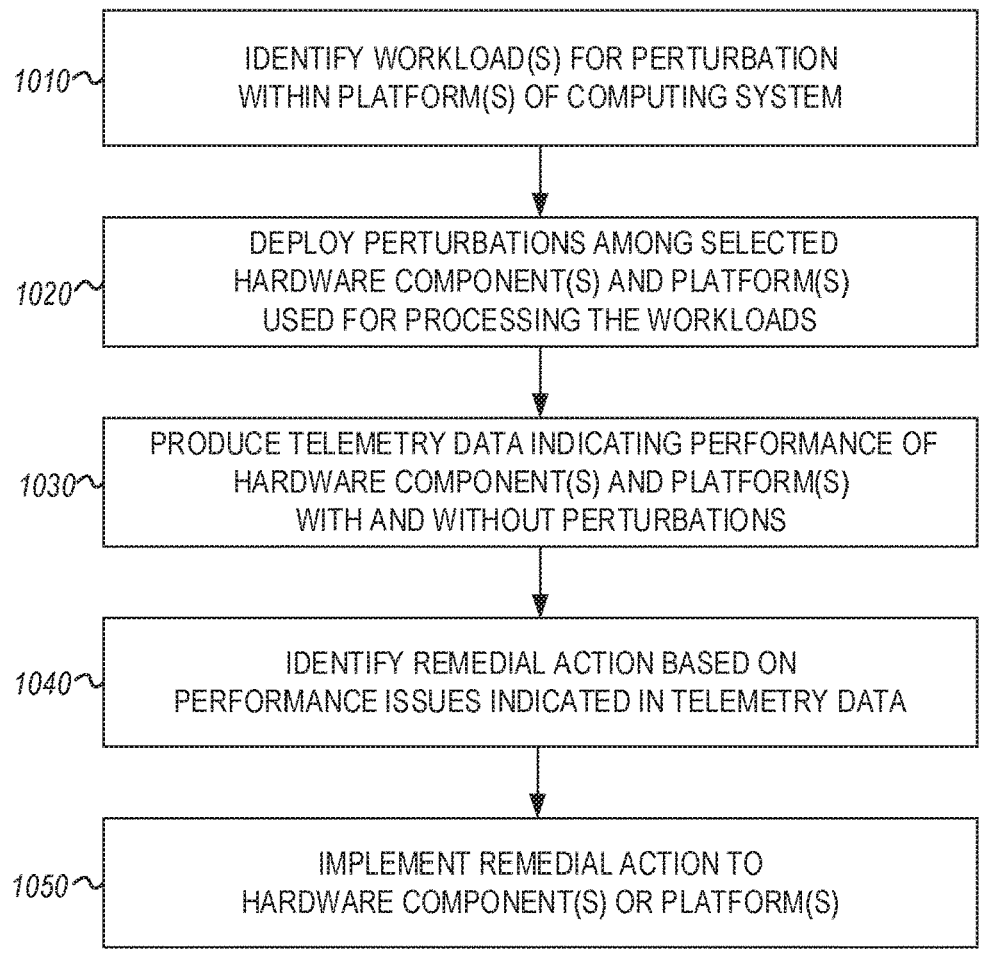

FIG. 10 illustrates a flowchart 1000 of an example process for deploying and controlling perturbations within a multi-tier edge computing environment. This flowchart 1000 is depicted from the perspective of a perturbations management unit (e.g., PMU 930) located on a local computing system; but it will be understood that operations from external computing systems, orchestration systems, or other entities may also be involved.

At operation 1010, one or more workloads are identified for perturbation, as part of execution of the workloads within the computing system. This identification may be based on the type of workload, characteristics of the workload, selection of workloads at random, selection of a particular testing criteria, or the like.

At operation 1020, one or more perturbations are deployed for the identified platforms, for use with selected hardware components. These hardware components and platforms are used for processing, handling, or servicing the workloads. For instance, any of the hardware components of a platform illustrated in FIG. 9, or described with reference to FIGS. 7A and 7B, may be used. The hardware components that are used are not limited to processor circuitry or compute units, but any number of other resources or components within the computing system memory, storage, acceleration, networking, etc.).

At operation 1030, the execution of the workload, with and without perturbations, on the computing platform produces telemetry data. This may be done on a workload-by-workload basis, a platform-by-platform basis, a node-by-node basis, in parallel; or on the same computing platform sequentially; in order to obtain different sets of telemetry data (e.g., with and without perturbations).

At operation 1040, one or more remedial actions are identified, based on the performance issues indicated in the telemetry data. The analysis of the telemetry may be performed with any number of statistical, rule-based, machine learning, or neural network models. Such remedial actions may also be suggested, approved, or modified based on user intervention.

At operation 1050, one or more remedial actions are implemented to hardware component(s) or platform(s). Such remedial actions may involve an iterative process for refinement of the testing scenario, or verifying hardware adjustments, including repeating additional perturbation operations 1010-1030.

Figure 11:
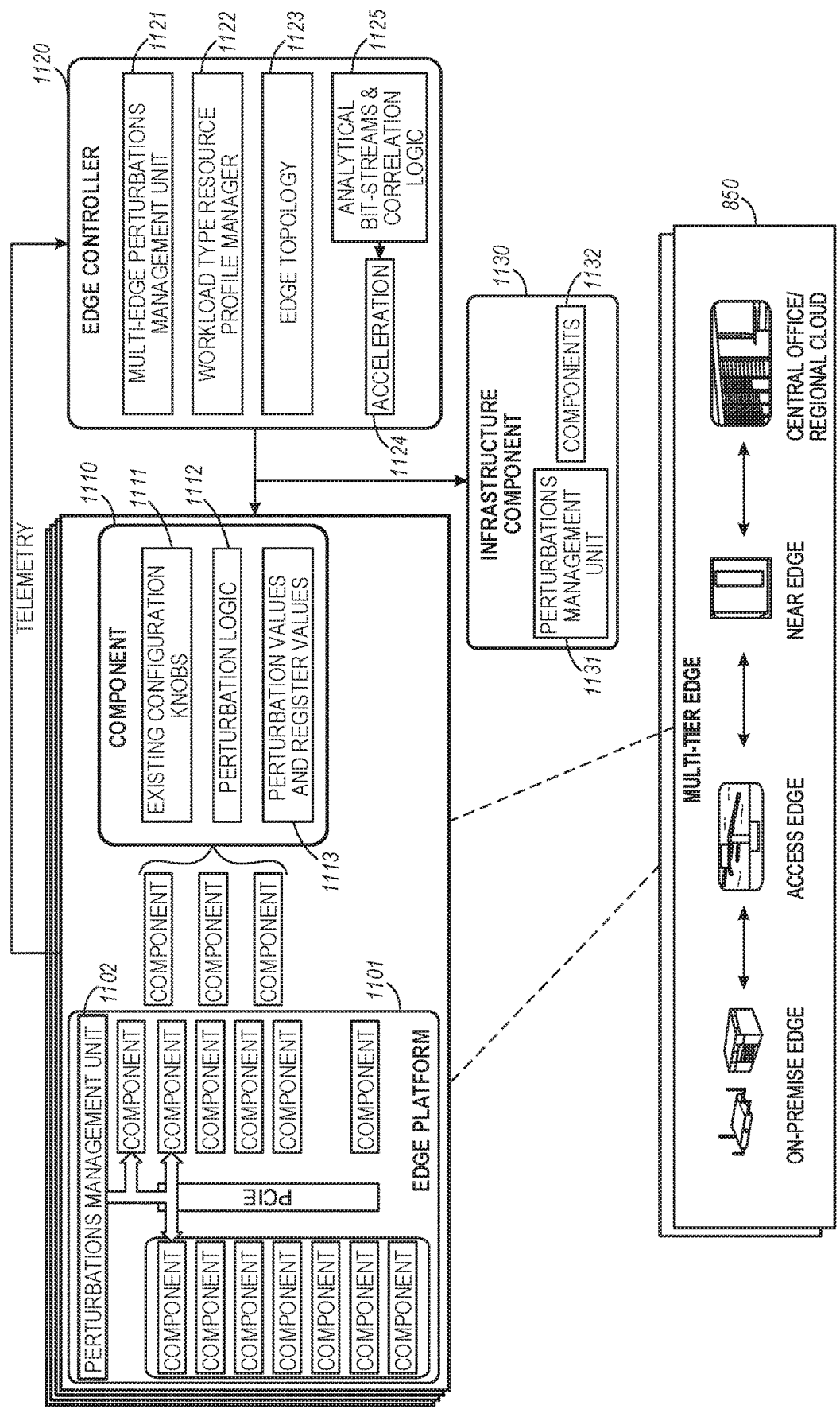
FIG. 11 illustrates components provided for configuration and deployment of perturbations within a multi-tier edge computing environment.

FIG. 11 illustrates components provided for configuration and deployment of perturbations within a multi-tier edge computing environment. Here, within an edge platform 1101, a PMU 1102 exposes a new interface that a software stack can access and use to implement perturbations in the computing environment. The PMU 1102 specifically lets software discover, setup and manage hardware perturbations which can be controlled, activated, and operated among different components in the edge platform 1101. Below itself, PMU 1102 accesses and utilizes hardware and firmware interfaces by which different components of the edge platform 1101 expose their perturbation capabilities, to integrate the components into a controlled usage, testing, and observation regime.

For instance, in the depicted environment of FIG. 11, a respective component 1110 of the edge platform 1101 (e.g., an edge server, blade, appliance, or other computing system) may, include configuration knobs 1111, perturbation logic 1112, and perturbation values and option register values 1113 (e.g., registers that enable the toggling or setting of options, distinguishable from general purpose processor register). A PMU 1102, driven by software operations, may change such configuration knobs 1111, introduce or control the perturbation logic 1112 to perform specific actions, and introduce or control the perturbation values and register values (e.g., model-specific register (MSR) values).

The edge platform 1101 may be in communication with an edge controller 1120, such as an orchestrator which distributes the software-based perturbation commands and scenarios to the respective edge platforms. For instance, an edge controller 1120 may include: a multi-edge PMU 1121 used for identifying and managing perturbations among multiple platforms; a workload type resource profile manager 1122 used for deploying sets of perturbations (profiles) that are customized to certain types of workloads or services, so that perturbations can be identified and managed perturbations among multiple, specific workload types and computing arrangements; an edge topology source 1123, which includes information regarding the edge network characteristics; acceleration features 1124, which analyze or produce different perturbation instructions; and a logic source 1125, which provides analytical bit streams and correlation logic for use with the acceleration features. For instance, an FPGA may be used to accept input (FPGA images or programs) as a bitstream, to program the gates in the FPGA.

It will be understood that the components 1124, 1.125 are optional, and the operations performed by the acceleration features 1124 can be alternatively implemented via software logic running on a CPU or otherwise. In an example, the acceleration features 1124 are used to:

a) instruct the different Perturbation Management Units, doing so by sending them various parameters for the operations of the perturbation management units; and h) collate and analyze the telemetry data flowing into units and managers 1121-1122 from the different machines and applications. (Although not shown in FIG. 11, telemetry data can also include data flowing hack from edge controller 1120 to edge platform 1110).

One purpose of the analysis of the telemetry data is to identify various performance sensitive, timing sensitive, and resource sensitive behaviors, and to extract statistical learnings, to determine whether any machine, hardware component, or application is very close to its area of marginal operation. For instance, such analysis can identify whether a particular unit is very close to being pushed over its safe operation margin or has already entered a region of unsafe operation, whether for performance or functional reasons. Normally this analysis is performed with telemetry logs, but the techniques discussed herein may proactively subject the system to small perturbations to test what is working well and what can fail, so that overall testing is accelerated, and so that remediation measures (such as more aggressive admission control and load balancing) can begin for those edge components and systems most likely to fail or deviate sharply from good performance. For example, if reducing processor frequency by a few percent causes very high rates of dropped network packets, then that would be an indication that the system is very fragile to small changes in load, or even small changes in bursty traffic through switches and routers.

Performing such operations with acceleration logic, as opposed to in software, may be beneficial for the following reasons: generally, the relationships between small perturbations (introduced into a complex system such as the edge network) and the failures or deviations from normal behavior is a very complicated one. Even just the processing of telemetry data at large scale is complicated, before one has attempted to discover patterns between its results and the perturbations induced at different components. Generally this analysis is done by training and using a deep learning based model (i.e., a neural network), or by using classical machine learning techniques like Support Vector Machines, Model-Trees, Contingency tables, etc. The mathematical computations that need to be performed in these models are often very compute intensive, and if done in software, can require many CPUs and need a lot more time. Such methods are ideally performed in special purpose units, such as the accelerators discussed herein (including acceleration 1124). Further, because edge configurations and machine capabilities may change all the time, the use of programmable acceleration supports the need to be able to train the analysis models (or to revise their training every so often). Such training and reprogramming is considerably more efficient with accelerators than it is with CPUs since accelerators can perform pipelines of computational steps with much less power/energy and much less time, because the computations can be performed in a "data flow" manner in the accelerators.

The edge controller 1120 and the edge platform 1101 may be operably coupled to an infrastructure component 1130, which itself includes an additional PMU 1131 and management components 1132. For instance, the infrastructure component 1130 may coordinate which perturbation scenarios are launched on which platforms and layers of the multi-tier edge. The infrastructure component 1130 may also ensure that perturbations are not introduced in times or scenarios that would be disruptive to the overall edge computing environment.

In an example, each component in an edge platform (e.g., edge platform 1101) or other deployed component includes a modifiable operational settings and a capability for receiving perturbation requests or commands. For instance, this capability for receiving requests of perturbation parameters may include stochastic variations to be effected for those settings, and a mechanism to responsively effect those variations. Additional capabilities may be furnished to and via the PMU 1102 to collect performance telemetry on those settings so that it can be blended with other telemetry from system's logical and physical Performance Monitoring Unit (not shown).

Within the edge platform 1101, the PMU 1102 may use a variety of mechanisms by which different architecture components (CPUs, memory controllers, HFI, Caching and Home agents, Uncore queues, etc.) are integrated. The PMU logic may be implemented in a baseboard management controller (BMC) and use existing paths; even as perturbation features provide interfaces to software, which allows software to discover and setup perturbations. In specific examples, BIOS and-or Pcode (processor microcode) are extended to setup the previous logic for boot time configuration.

In further examples, system software and drivers are extended so that they abstract PMU delivered capabilities for software friendly use. For instance, higher level software may specify logical variations, which are translated by low level software into requests appropriate for PMU. Appropriately privileged user level utilities can discover what factors can be logically perturbed and can then issue requests at that level of comprehension without becoming entwined into hardware minutia. Additionally, things happening during the execution of the applications can be sent back to the perturbation management logic in order to include the information in order to better capture how to stress and test out a particular edge type of application when tested with the perturbation process.

As will be understood, individual components in the platform or PCI-E devices may implement perturbations. Within the edge platform 1101, a PCI-E protocol may be extended to let PMU 1102 discover the perturbations capabilities of PCI-E connected devices, and to exercise those capabilities. For example, to perturb memory bandwidth stochastically, different parameters for the memory controller may be set up so that it offers a defined stochastic variation in clocking, queuing, etc. Model specific registers (MSRs) may show software perturbations effective in real time.

As specific examples, a perturbation may be defined by the following properties; additional properties are also possible though not listed:
  a) The type of perturbation that it is implementing (e.g., Latency perturbations, Bandwidth changes, Specific register values (e.g., MSRs, covering misc. policies such as CAT, Turbo, Prefetching, etc.))
  b) The list of values associate to the perturbation (e.g., 1, 2, 4 CORE_TO_CA credits)
  c) How the perturbation has to change to a different perturbation value: fixed amount of time or randomly.

The perturbation process for a particular type of application is tuned as the system evolves. It is not practical to perturbate everything. As a result, the process learns with the behavior of the workloads deployed in different locations and identifying potential sources of performance degradation that need included in the perturbation process that happens on a new update of the workloads. As will be understood, such processing may be expanded with the use of machine learning, orchestration, and other adaptation.

In a further example, learning of perturbations may be used to identify a correlation of failures. As will be understood, failures can be OT (Operations Technology) based or IT (Information Technology) based. IT typically refers to information processing while OT typically refers to sensor networks and embedded control. (Devices such as a "mantrap" or access control vestibule protecting physical access at an office building blends IT and OT in a single solution.) Analysis of errors and failures that arise from hardware components or physical causes such as power or thermal surges (generally tracked under OT category) facilitates prediction of Mean-time-between-failure (MTBF) rates. Analysis of software defects and estimations of software defect densities (using code inspections, anomaly detections, bug testing, timing sensitivity studies etc., generally tracked under IT category) facilitates prediction of faults and loading parameters for stable-performance operation. Traditionally, these failures are tracked/managed independently. However, a variety of hardware failure can result in software failures. Similarly, software failures can cause hardware failures. In a complex edge computing ecosystem, it is not practical to withhold deployment of various components and systems for exhaustive and end-to-end testing to complete. Instead, components and systems need to be tested continually, "on the fly", in deployment with the use and management of small, controlled excursions of stresses through statistical quality testing through injected variations, or perturbations.

Customers require detailed understanding of which configurations and combinations of hardware, firmware, software, and data sets have been used together by other tenants. A success/failure score card can be maintained for each combination of components and sub-components used with the present approaches. The score card provides a reputation to be maintained that may be used by others when deciding to deploy with certain hardware, firmware, and software. It allows for proactive and informed decision making that can be incorporated into SLAs as well as into orchestration where reliability, safety, resiliency are relevant factors.

In a further example, security of the various PMU control interfaces may be implemented to prevent rogue or unintended usage. Because the PMU is used to throttle or limit actual functionality and performance optimized operations, it is a capability that could be abused if control interfaces are not guarded. In an example, the following approaches may be used for protecting the PMU interfaces:

1) Hard/soft strap that disables PMU in deployment environments. This ensures the PMU is always unavailable when safety critical operations and workloads are to be performed. Normally, the safety critical workloads are deployed in simulation or non-production environments first where failure cases can be identified safely.

2) Root of Trust protected HW enable/disable module. Hardware designs often incorporate a secure root-of-trust capability such as a secure startup service (S3M) or power failure restart (PER) module. These roots of trust may be configured to bring up the hardware in a PMU capable mode or may disable it. This allows temporary enablement of a production network to work in a non-production mode where failure analysis can be performed safely. For example, if an access control vestibule is not functioning, when bringing it up in non-production mode, the doors to the trap may be locked in the closed position and disabled while in non-production mode. Even though the maintenance staff are performing simulations using actual hardware, the door function remains disabled (in a safe position).

3) TEE protected enable/disable. Many CPU architectures are equipped with a trusted execution environment (TEE) technology that is highly resistant to malicious attack. The PMU configuration and control interfaces may be exposed only to TEE modules where the code that is loaded into the TEE can be attested and authenticated. Only approved TEE code modules would have access to PMU interfaces. This allows the greatest flexibility to integrate PMU operations with concurrent production operations while maintaining a reasonable protection from malicious code.

In further examples, the various PMUs at each level may coordinate amongst each other. For instance, each edge platform PMU 1102 may report up to either the infrastructure component PMU 1131 or the edge server PMU 1121, and further be downstream coordinated from the edge server PMU 1121 and/or the infrastructure component PMU 1131. Within this arrangement, infrastructure PMU 1131 can also perform large-scale coordination or analysis to deploy perturbations based on profiles, edge platform types, and to coordinate collection of telemetry and operations. Although not discussed in detail, a variety of reports, recommendations, and inferences may also be generated from the results of the PMU coordination.

Figure 12:
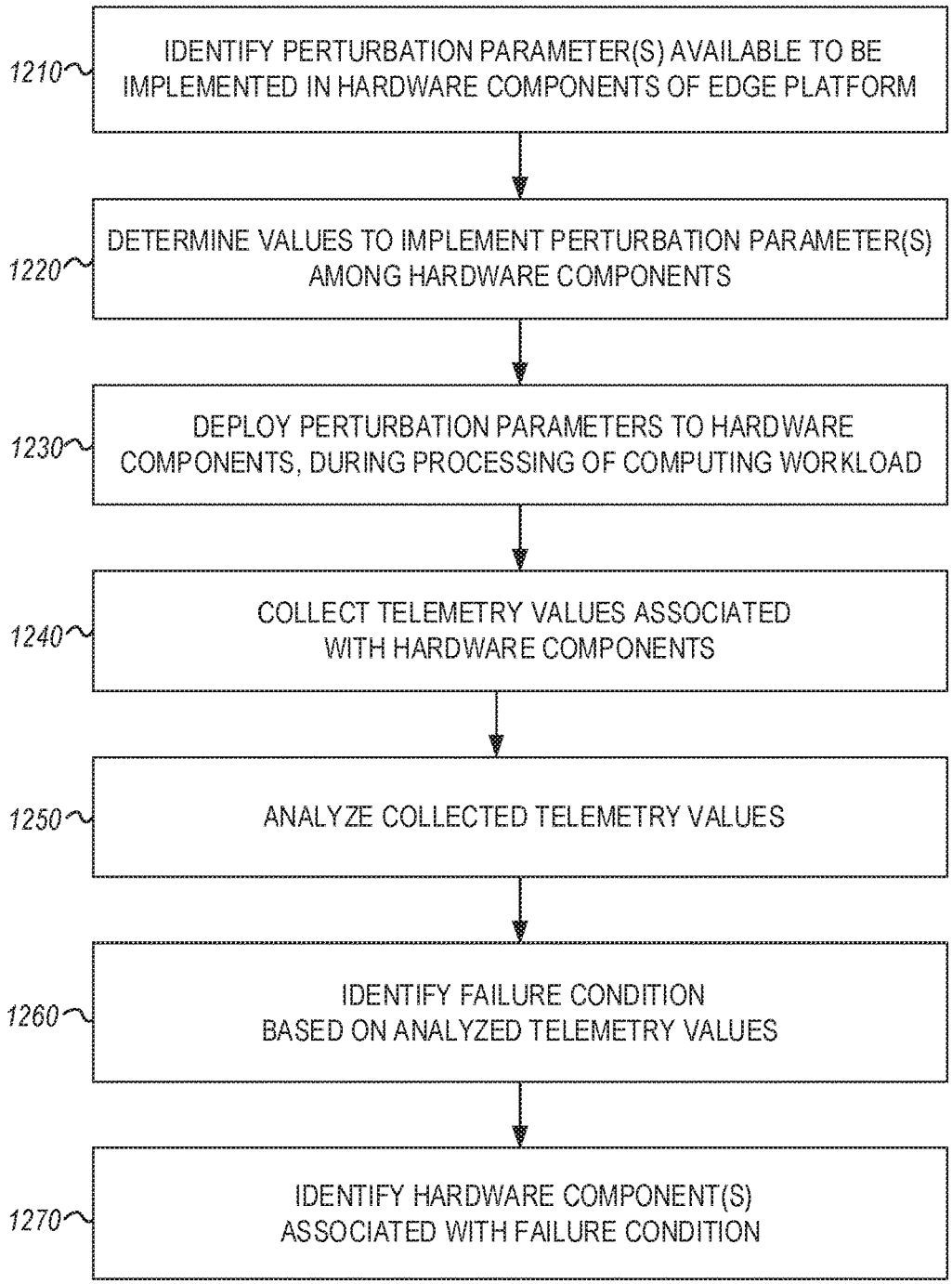
FIG. 12 illustrates a flowchart of example operations for implementing controlled perturbations in an edge computing environment.

FIG. 12 illustrates a flowchart 1200 of example operations for implementing controlled perturbations in an edge computing environment. In specific examples, the following operations are performed is using a perturbations management unit (PMU) implemented in hardware of an edge computing node or platform, such as with the PMU configurations discussed above that are configured to introduce perturbations in an edge computing service. In various examples, the edge computing service is adapted for operation at a plurality of locations in the edge computing environment, and perturbation parameters are customized to operate in a specific location in the edge computing environment. However, other approaches may be implemented.

At operation 1210, one or more perturbation parameters are identified, for parameters that are available to be implemented in hardware components of an edge platform or node. As discussed in the examples above, the edge platform or node is configured to provide an edge computing service using the hardware components.

At operation 1220, values are determined to implement one or more perturbation parameters among the hardware components of the edge platform or node. In an example, the perturbation parameters, as implemented with the hardware components, provide stochastic variations to disrupt the operation of the service.

At operation 1230, the perturbation parameters are deployed to hardware components, during processing of computing workload at the edge platform or node. In an example, the hardware components implement the perturbation effects by implementing at least one of: changing configuration knobs of the hardware components; executing perturbation logic from the hardware components; or controlling register values modifying the hardware components.

At operation 1240, telemetry values associated with the hardware components are collected. In an example, telemetry values associated with the hardware components provide performance measurements of the hardware components, such as for at least one of: events of the service, requests of the service, or data streams used by the service. Also, in an example, the perturbation effects restrict the hardware components to perform compute operations for the service, and the perturbation effects are implemented in the edge platform or node by at least one of: latency changes, bandwidth changes, or changed register values.

At operation 1250, the telemetry values are analyzed, such as with use of at least one statistical model. At operation 1260, one or more failure conditions, including unacceptable excursions in throughput, latency, jitter, etc., are identified, based on the analyzed telemetry values. At operation 1270, one or more hardware components are identified, that are associated with or indicative of the failure condition. Based on this analysis, remedial or other actions may be taken. Finally, a computing operation may be caused to occur, triggered, or controlled, based on the collected telemetry values and this analysis. For instance, a specific computing system operation (in the form of software control, data operation, output, message, signal, etc.) may occur based on the identified failure condition or based on the identified analysis or remedial action.

As noted above, execution of these operations in a computing system may be performed by a PMU. In a specific example, the PMU is connected to the hardware components via at least one interconnect, and the PMU including a plurality of hardware interfaces and a plurality of firmware interfaces by which the hardware components expose perturbation capabilities. For instance, the PMU may operate using with a plurality of software interfaces that receive commands from among a plurality of software components of the edge computing node, for implementing the following operations. In a further example, the software interfaces enable discovery, setup, and management of the perturbation effects and perturbation execution process. In a further example, the PMU includes a plurality of control interfaces to modify operation of the PMU, and the control interfaces are modified by one or more of: a hard or soft strap to enable or disable the PMU, a root-of-trust-protected component to enable or disable the PMU, or a trusted execution environment code module to enable or disable the PMU.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: a plurality of hardware components, including a processing circuitry and a perturbations management unit; a memory device including instructions embodied thereon, wherein the instructions, which when executed by the processing circuitry, configure the hardware components to perform operations to: identify at least one perturbation parameter available to be implemented with the plurality of hardware components, the plurality of hardware components configured to provide an edge computing service using the hardware components; determine values to implement the perturbation parameter among the hardware components, the values of the perturbation parameters identified to disrupt operation of the service; deploy the perturbation parameters to the hardware components, during operation of the service to process a computing workload, to cause perturbation effects on the service; collect telemetry values associated with the hardware components, produced during operation of the service to process the computing workload, the telemetry values to indicate the perturbation effects upon the operation of the service; and cause a computing operation to occur based on the collected telemetry values.

In Example 2, the subject matter of Example 1 optionally includes subject matter where the telemetry values associated with the hardware components provide performance measurements of the hardware components for at least one of: events of the service, requests of the service, or data streams used by the service.

In Example 3, the subject matter of any one or more of Examples 1-2 optionally include subject matter where the perturbation parameter implements the perturbation effects in the computing system, by restricting the hardware components to perform compute operations for the service, and wherein the perturbation effects are implemented in the computing system by at least one of: latency changes, bandwidth changes, or changed options register values.

In Example 4, the subject matter of any one or more of Examples 1-3 optionally include the operations to: analyze the collected telemetry values with at least one statistical model; and identify at least one failure of the hardware components from the analyzed telemetry values.

In Example 5, the subject matter of Example 4 optionally includes operations to: identify a particular hardware component of the plurality of the hardware components providing a cause of the at least one failure.

In Example 6, the subject matter of any one or more of Examples 1-5 optionally, include subject matter where the values of the perturbation parameters are associated with a specific profile to disrupt the operation of the service, and wherein deploying the perturbation parameters to the hardware components includes use of at least one interface of the hardware components to set the perturbation parameters, that cause the hardware components to disrupt the operation of the service, based on the specific profile.

In Example 7, the subject matter of any one or more of Examples 1-6 optionally include subject matter where the operations are performed using a perturbations management unit (PMU) of the computing system, the PMU connected to the hardware components via at least one interconnect, the PMU including a plurality of hardware interfaces and a plurality of firmware interfaces by which the hardware components expose perturbation capabilities, and the PMU operating with a plurality of software interfaces that receive commands from among a plurality of software components of the computing system.

In Example 8, the subject matter of Example 7 optionally includes subject matter where the PMU includes a plurality of control interfaces to modify operation of the PMU, wherein the control interfaces are modified by one or more of: a hard or soft strap to enable or disable the PMU, a root-of-trust-protected component to enable or disable the PMU, or a trusted execution environment code module to enable or disable the PMU.

In Example 9, the subject matter of any one or more of Examples 7-8 optionally, include subject matter where the software interfaces enable discovery, setup, and management of the perturbation effects and perturbation execution process.

In Example 10, the subject matter of any one or more of Examples 1-9 optionally include subject matter where the hardware components implement the perturbation effects by implementing at least one of: changing configuration knobs of the hardware components; executing perturbation logic from the hardware components; or controlling option register values modifying the hardware components.

In Example 11, the subject matter of any one or more of Examples 1-10 optionally include subject matter where the perturbation parameters provide stochastic variations to disrupt the operation of the service.

In Example 12, the subject matter of any one or more of Examples 1-11 optionally include subject matter where the edge computing service is adapted for operation at a plurality of locations in an edge computing environment, and wherein the perturbation parameters are customized to operate in a specific location in the edge computing environment.

Example 13 is a method for implementing controlled perturbations in an edge computing environment, comprising: identifying at least one perturbation parameter available to be implemented with a plurality of hardware components of an edge computing node, the edge computing node configured to provide a service using the hardware components; determining values to implement the perturbation parameter among the hardware components, the values of the perturbation parameters identified to disrupt operation of the service; deploying the perturbation parameters to the hardware components, during operation of the service to process a computing workload, to cause perturbation effects on the service; collecting telemetry values associated with the hardware components, produced during operation of the service to process the computing workload, the telemetry values to indicate the perturbation effects upon the operation of the service; and causing a computing operation to occur based on the collected telemetry values.

In Example 14, the subject matter of Example 13 optionally includes subject matter where the telemetry values associated with the hardware components provide performance measurements of the hardware components for at least one of: events of the service, requests of the service, or data streams used by the service.

In Example 15, the subject matter of any one or more of Examples 13-14 optionally include subject matter where the perturbation parameter implements the perturbation effects in the computing system, by restricting the hardware components to perform compute operations for the service, and wherein the perturbation effects are implemented in the edge computing node by at least one of: latency changes, bandwidth changes, or changed option register values.

In Example 16, the subject matter of any one or more of Examples 13-15 optionally include analyzing the collected telemetry values with at least one statistical model; and identifying at least one failure of the hardware components from the analyzed telemetry values.

In Example 17, the subject matter of Example 16 optionally includes identifying a particular hardware component of the plurality of the hardware components providing a cause of the at least one failure.

In Example 18, the subject matter of any one or more of Examples 13-17 optionally include subject matter where the values of the perturbation parameters are associated with a specific profile to disrupt the operation of the service, and wherein deploying the perturbation parameters to the hardware components includes use of at least one interface of the hardware components to set the perturbation parameters, that cause the hardware components to disrupt the operation of the service, based on the specific profile.

In Example 19, the subject matter of any one or more of Examples 13-18 optionally include subject matter where the method is performed using a perturbations management unit (PMU) implemented in hardware of the edge computing node, the PMU connected to the hardware components via at least one interconnect, the PMU including a plurality of hardware interfaces and a plurality of firmware interfaces by which the hardware components expose perturbation capabilities, and the PMU operating with a plurality of software interfaces that receive commands from among a plurality of software components of the edge computing node.

In Example 20, the subject matter of Example 19 optionally includes subject matter where the PMU includes a plurality of control interfaces to modify operation of the PMU, wherein the control interfaces are modified by one or more of: a hard or soft strap to enable or disable the PMU, a root-of-trust-protected component to enable or disable the PMU, or a trusted execution environment code module to enable or disable the PMU.

In Example 21, the subject matter of any one or more of Examples 19-20 optionally include subject matter where the software interfaces enable discovery, setup, and management of the perturbation effects and perturbation execution process.

In Example 22, the subject matter of any one or more of Examples 13-21 optionally include subject matter where the hardware components implement the perturbation effects by implementing at least one of: changing configuration knobs of the hardware components; executing perturbation logic from the hardware components; or controlling option register values modifying the hardware components.

In Example 23, the subject matter of any one or more of Examples 13-22 optionally include subject matter where the perturbation parameters provide stochastic variations to disrupt the operation of the service.

In Example 24, the subject matter of any one or more of Examples 13-23 optionally include subject matter where the edge computing service is adapted for operation at a plurality of locations in the edge computing environment, and wherein the perturbation parameters are customized to operation in a specific location in the edge computing environment.

Example 25 is at least one machine-readable storage device comprising instructions stored thereupon, which when executed by processing circuitry of an edge computing system, cause the processing circuitry to perform operations comprising: identifying at least one perturbation parameter available to be implemented with a plurality of hardware components of an edge computing system, the edge computing system configured to provide a service using the hardware components; determining values to implement the perturbation parameter among the hardware components, the values of the perturbation parameters identified to disrupt operation of the service; deploying the perturbation parameters to the hardware components, during operation of the service to process a computing workload, to cause perturbation effects on the service; collecting telemetry values associated with the hardware components, produced daring operation of the service to process the computing workload, the telemetry values to indicate the perturbation effects upon the operation of the service; and cause a computing operation to occur based on the collected telemetry values.

In Example 26, the subject matter of Example 25 optionally includes wherein the telemetry values associated with the hardware components provide performance measurements of the hardware components for at least one of: events of the service, requests of the service, or data streams used by the service.

In Example 27, the subject matter of any one or more of Examples 25-26 optionally include subject matter where the perturbation parameter implements the perturbation effects in the computing system, by restricting the hardware components to perform compute operations for the service, and wherein the perturbation effects are implemented in the edge computing system by at least one of: latency changes, bandwidth changes, or changed option register values.

In Example 28, the subject matter of any one or more of Examples 25-27 optionally include the operations further comprising: analyzing the collected telemetry values with at least one statistical model; and identifying at least one failure of the hardware components from the analyzed telemetry values.

In Example 29, the subject matter of Example 28 optionally includes the operations further comprising: identifying a particular hardware component of the plurality of the hardware components providing a cause of the at least one failure.

In Example 30, the subject matter of any one or more of Examples 25-29 optionally include subject matter where the values of the perturbation parameters are associated with a specific profile to disrupt the operation of the service, and wherein deploying the perturbation parameters to the hardware components includes use of at least one interface of the hardware components to set the perturbation parameters, that cause the hardware components to disrupt the operation of the service, based on the specific profile.

In Example 31, the subject matter of any one or more of Examples 25-30 optionally include subject matter where the operations are performed using a perturbations management unit (PMU) implemented in hardware of the edge computing system, the PMU connected to the hardware components via at least one interconnect, the PMU including a plurality of hardware interfaces and a plurality of firmware interfaces by which the hardware components expose perturbation capabilities, and the PMU operating with a plurality of software interfaces that receive commands from among a plurality of software components of the edge computing system.

In Example 32, the subject matter of Example 31 optionally includes wherein the PMU includes a plurality of control interfaces to modify operation of the PMU, wherein the control interfaces are modified by one or more of: a hard or soft strap to enable or disable the PMU, a root-of-trust-protected component to enable or disable the PMU, or a trusted execution environment code module to enable or disable the PMU.

In Example 33, the subject matter of any one or more of Examples 31-32 optionally include subject matter where the software interfaces enable discovery, setup, and management of the perturbation effects and perturbation execution process.

In Example 34, the subject matter of any one or more of Examples 25-33 optionally include subject matter where the hardware components implement the perturbation effects by implementing at least one of: changing configuration knobs of the hardware components; executing perturbation logic from the hardware components; or controlling option register values modifying the hardware components.

In Example 35, the subject matter of any one or more of Examples 25-34 optionally include subject matter where the perturbation parameters provide stochastic variations to disrupt the operation of the service.

In Example 36, the subject matter of any one or more of Examples 25-35 optionally include subject matter where the edge computing service is adapted for operation at a plurality of locations in an edge computing environment, and wherein the perturbation parameters are customized to operation in a specific location in the edge computing environment.

Example 37 is a multi-tier edge computing system, comprising a plurality of edge computing nodes provided among on-premise edge, network access edge, or near edge computing settings, the plurality of edge computing nodes configured to perform any of the perturbation management methods of Examples 1 to 36.

Example 38 is an edge computing system, comprising a plurality of edge computing nodes, each of the plurality of edge computing nodes configured to perform any of the perturbation management methods of Examples 1 to 36.

Example 39 is an edge computing node, operable in an edge computing system, comprising processing circuitry coupled to perturbations management unit circuitry configured to implement any of the perturbation management methods of Examples 1 to 36.

Example 40 is an edge computing node, operable as a server hosting the service and a plurality of additional services in an edge computing system, configured to perform any of the perturbation management methods of Examples 1 to 36.

Example 41 is an edge computing node, operable in a layer of an edge computing network as an aggregation node, network hub node, gateway node, or core data processing node, configured to perform any of the perturbation management methods of Examples 1 to 36.

Example 42 is an edge provisioning, orchestration, or management node, operable in an edge computing system, configured to implement any of the perturbation management methods of Examples 1 to 36.

Example 43 is an edge computing network, comprising networking and processing components configured to provide or operate a communications network, to enable an edge computing system to implement any of the perturbation management methods of Examples 1 to 36.

Example 44 is an access point, comprising networking and processing components configured to provide or operate a communications network, to enable an edge computing system to implement any of the perturbation management methods of Examples 1 to 36.

Example 45 is a base station, comprising networking and processing components configured to provide or operate a communications network, configured as an edge computing system to implement any of the perturbation management methods of Examples 1 to 36.

Example 46 is a road-side unit, comprising networking components configured to provide or operate a communications network, configured as an edge computing system to implement any of the perturbation management methods of Examples 1 to 36.

Example 47 is an on-premise server, operable in a private communications network distinct from a public edge computing network, configured as an edge computing system to implement any of the perturbation management methods of Examples 1 to 36.

Example 48 is a 3GPP 4G/LTE mobile wireless communications system, comprising networking and processing components configured as an edge computing system to implement any of the perturbation management methods of Examples 1 to 36.

Example 49 is a 5G network mobile wireless communications system, comprising networking and processing components configured as an edge computing system to implement any of the perturbation management methods of Examples 1 to 36.

Example 50 is an edge computing system configured as an edge mesh, provided with a microservice cluster, a microservice cluster with sidecars, or linked microservice clusters with sidecars, configured to implement any of the perturbation management methods of Examples 1 to 36.

Example 51 is an edge computing system, comprising circuitry configured to implement services with one or more isolation environments provided among dedicated hardware, virtual machines, containers, or virtual machines on containers, the edge computing system configured to implement any of the perturbation management methods of Examples 1 to 36.

Example 52 is an edge computing system, comprising networking and processing components to communicate with a user equipment device, client computing device, provisioning device, or management device to implement any of the perturbation management methods of Examples 1 to 36.

Example 53 is networking hardware with network functions implemented thereupon, operable within an edge computing system, the network functions configured to implement any of the perturbation management methods of Examples 1 to 36.

Example 54 is acceleration hardware with acceleration functions implemented thereupon, operable in an edge computing system, the acceleration functions configured to implement any of the perturbation management methods of Examples 1 to 36.

Example 55 is storage hardware with storage capabilities implemented thereupon, operable in an edge computing system, the storage hardware configured to implement any of the perturbation management methods of Examples 1 to 36.

Example 56 is computation hardware with compute capabilities implemented thereupon, operable in an edge computing system, the computation hardware configured to implement any of the perturbation management methods of Examples 1 to 36.

Example 57 is an edge computing system configured to implement services with any of the perturbation management methods of Examples 1 to 36, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 58 is an apparatus of an edge computing system comprising: one or more processors and one or more computer-readable media comprising instructions that, when executed by the one or more processors, cause the one or more processors to perform any of the methods of Examples 1 to 36.

Example 59 is one or more computer-readable storage media comprising instructions to cause an electronic device of an edge computing system, upon execution of the instructions by one or more processors of the electronic device, to perform any of the perturbation management methods of Examples 1 to 36.

Example 60 is a computer program used in an edge computing system, the computer program comprising instructions, wherein execution of the program by a processing element in the edge computing system is to cause the processing element to perform any of the perturbation management methods of Examples 1 to 36.

Example 61 is an edge computing appliance device operating as a self-contained processing system, comprising a housing, case or shell, network communication circuitry, storage memory circuitry, and processor circuitry, adapted to perform any of the perturbation management methods of Examples 1 to 36.

Example 62 is an apparatus of an edge computing system comprising means to perform any of the perturbation management methods of Examples 1 to 36.

Example 63 is an apparatus of an edge computing system comprising logic, modules, or circuitry to perform any of the perturbation management methods of Examples 1 to 36.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A computing system, comprising:
    a plurality of hardware components including processing circuitry; and
    a memory device including instructions embodied thereon, wherein the instructions, which when executed by the processing circuitry, configure the hardware components to perform operations to:
        identify perturbation parameters to be implemented that change processing capabilities of the processing circuitry, the processing circuitry configured to provide a service;
        determine values to implement the perturbation parameters in the processing circuitry, the values of the perturbation parameters identified to disrupt operation of the service;
        deploy the perturbation parameters to the processing circuitry, during operation of the service to process a computing workload, to cause perturbation effects on the service, wherein the perturbation effects are implemented by the processing circuitry via: at least one configuration knob, execution of perturbation logic, or register values;
        collect telemetry values associated with the processing circuitry, produced during operation of the service to process the computing workload, the telemetry values to indicate the perturbation effects upon the operation of the service; and
        cause a new or modified computing operation to occur in the computing system based on the collected telemetry values.

2. The computing system of claim 1, wherein the telemetry values associated with the processing circuitry provide performance measurements of the processing circuitry for at least one of: events of the service, requests of the service, or data streams used by the service.

3. The computing system of claim 1, wherein the perturbation parameters implement the perturbation effects in the computing system, by restricting the processing circuitry to perform compute operations for the service, and wherein the perturbation effects are implemented in the computing system by at least one of: latency changes, bandwidth changes, or changed options register values.

4. The computing system of claim 1, the instructions further to configure the hardware components to perform operations to:
    analyze the collected telemetry values with at least one statistical model; and
    identify at least one failure of the hardware components from the analyzed telemetry values.

5. The computing system of claim 4, the instructions further to configure the hardware components to perform operations to:
identify a particular hardware component of the plurality of the hardware components providing a cause of the at least one failure.

6. The computing system of claim 1, wherein the values of the perturbation parameters are associated with a specific profile to disrupt the operation of the service, and wherein deploying the perturbation parameters to the processing circuitry includes use of at least one interface of the processing circuitry to set the perturbation parameters, and wherein deploying the perturbation parameters causes the processing circuitry to disrupt the operation of the service based on the specific profile.

7. The computing system of claim 1, wherein the operations are coordinated with a perturbations management unit (PMU) of the computing system, the PMU connected to the processing circuitry via at least one interconnect, the PMU including a plurality of hardware interfaces and a plurality of firmware interfaces to invoke perturbation capabilities, and the PMU operating with a plurality of software interfaces that receive commands from among a plurality of software components of the computing system.

8. The computing system of claim 7, wherein the PMU includes a plurality of control interfaces to modify operation of the PMU, wherein the control interfaces are modified by one or more of: a hard or soft strap to enable or disable the PMU, a root-of-trust-protected component to enable or disable the PMU, or a trusted execution environment code module to enable or disable the PMU.

9. The computing system of claim 7, wherein the software interfaces enable discovery, setup, and management of the perturbation effects and perturbation execution process.

10. The computing system of claim 1, wherein the perturbation parameters provide stochastic variations to disrupt the operation of the service.

11. The computing system of claim 1, wherein the service is adapted for operation at a plurality of locations in an edge computing environment, and wherein the perturbation parameters are customized to operate in a specific location in the edge computing environment.

12. At least one non-transitory machine-readable storage device comprising instructions stored thereupon, which when executed by processing circuitry of an edge computing system, cause the processing circuitry to perform operations comprising:
identifying perturbation parameters that change processing capabilities of the processing circuitry, the perturbation parameters to be implemented with the processing circuitry during operations to provide a service;
determining values to implement the perturbation parameters in the processing circuitry, the values of the perturbation parameters identified to disrupt operation of the service;
deploying the perturbation parameters to the processing circuitry, during operation of the service to process a computing workload, to cause perturbation effects on the service, wherein the perturbation effects are implemented by the processing circuitry via: at least one configuration knob, execution of perturbation logic, or register values;
collecting telemetry values associated with the processing circuitry, produced during operation of the service to process the computing workload, the telemetry values to indicate the perturbation effects upon the operation of the service; and
causing a new or modified computing operation to occur in the edge computing system based on the collected telemetry values.

13. The machine-readable storage device of claim 12, wherein the telemetry values associated with the processing circuitry provide performance measurements of the processing circuitry for at least one of: events of the service, requests of the service, or data streams used by the service.

14. The machine-readable storage device of claim 12, wherein the perturbation parameters implement the perturbation effects in the edge computing system, by restricting the processing circuitry to perform compute operations for the service, and wherein the perturbation effects are implemented in the edge computing system by at least one of: latency changes, bandwidth changes, or changed option register values.

15. The machine-readable storage device of claim 12, the operations further comprising:
analyzing the collected telemetry values with at least one statistical model; and
identifying at least one failure from the analyzed telemetry values.

16. The machine-readable storage device of claim 15, the operations further comprising:
identifying a particular hardware component providing a cause of the at least one failure.

17. The machine-readable storage device of claim 12, wherein the values of the perturbation parameters are associated with a specific profile to disrupt the operation of the service, and wherein deploying the perturbation parameters to the processing circuitry includes use of at least one interface of the processing circuitry to set the perturbation parameters, and wherein deploying the perturbation parameters causes the processing circuitry to disrupt the operation of the service based on the specific profile.

18. The machine-readable storage device of claim 12, wherein the operations are coordinated with a perturbations management unit (PMU) implemented in hardware of the edge computing system, the PMU connected to the processing circuitry via at least one interconnect, the PMU including a plurality of hardware interfaces and a plurality of firmware interfaces to invoke perturbation capabilities, and the PMU operating with a plurality of software interfaces that receive commands from among a plurality of software components of the edge computing system.

19. The machine-readable storage device of claim 18, wherein the PMU includes a plurality of control interfaces to modify operation of the PMU, wherein the control interfaces are modified by one or more of: a hard or soft strap to enable or disable the PMU, a root-of-trust-protected component to enable or disable the PMU, or a trusted execution environment code module to enable or disable the PMU.

20. The machine-readable storage device of claim 18, wherein the software interfaces enable discovery, setup, and management of the perturbation effects and perturbation execution process.

21. The machine-readable storage device of claim 12, wherein the service is adapted for operation at a plurality of locations in an edge computing environment, wherein the perturbation parameters are customized to operation in a specific location in the edge computing environment, and wherein the perturbation parameters provide stochastic variations to disrupt the operation of the service.

22. An apparatus, comprising:
means for identifying perturbation parameters that change processing capabilities of processing circuitry of an edge computing system, the perturbation parameters to be implemented with processing circuitry during operations to provide a service;

means for calculating values to implement the perturbation parameters in the processing circuitry, the values of the perturbation parameters identified to disrupt operation of the service;

means for deploying the perturbation parameters to the processing circuitry, during operation of the service to process a computing workload, to cause perturbation effects on the service, wherein the means for deploying the perturbation parameters includes at least one of:
- means for changing configuration knobs of the processing circuitry;
- means for executing perturbation logic from the processing circuitry; or
- means for controlling option register values modifying the processing circuitry;

means for obtaining telemetry values associated with the processing circuitry, produced during operation of the service to process the computing workload, the telemetry values to indicate the perturbation effects upon the operation of the service; and means for signaling a new or modified computing operation to occur based on the obtained telemetry values.

23. The apparatus of claim 22, wherein the service is adapted for operation at a plurality of locations in an edge computing environment, wherein the perturbation parameters are customized to operation in a specific location in the edge computing environment, and wherein the perturbation parameters provide stochastic variations to disrupt the operation of the service.

* * * * *